(12) United States Patent
Tian et al.

(10) Patent No.: US 12,500,231 B2
(45) Date of Patent: Dec. 16, 2025

(54) POSITIVE ELECTRODE ACTIVE MATERIAL, SODIUM ION SECONDARY BATTERY COMPRISING SAME AND POWER CONSUMING DEVICE

(71) Applicant: CONTEMPORARY AMPEREX TECHNOLOGY (HONG KONG) LIMITED, Hong Kong (CN)

(72) Inventors: Jiarui Tian, Fujian (CN); Xinxin Zhang, Fujian (CN); Chuying Ouyang, Fujian (CN); Yongsheng Guo, Fujian (CN); Yuejuan Wan, Fujian (CN); Wenguang Lin, Fujian (CN); Jiadian Lan, Fujian (CN); Jixiang Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/529,592

(22) Filed: Dec. 5, 2023

(65) Prior Publication Data
US 2024/0105923 A1 Mar. 28, 2024

Related U.S. Application Data

(63) Continuation of application No. PCT/CN2021/143827, filed on Dec. 31, 2021.

(51) Int. Cl.
*H01M 4/38* (2006.01)
*H01M 4/36* (2006.01)
(Continued)

(52) U.S. Cl.
CPC ........... *H01M 4/381* (2013.01); *H01M 4/366* (2013.01); *H01M 4/58* (2013.01); *H01M 10/052* (2013.01);
(Continued)

(58) Field of Classification Search
None
See application file for complete search history.

(56) References Cited

U.S. PATENT DOCUMENTS

| 2014/0370187 A1 | 12/2014 | Vail et al. | |
| 2019/0131625 A1* | 5/2019 | Wang | H01M 4/0471 |
| 2019/0348678 A1* | 11/2019 | Peng | H01M 4/133 |

FOREIGN PATENT DOCUMENTS

| CN | 107364875 A | 11/2017 |
| CN | 107452948 A | 12/2017 |

(Continued)

OTHER PUBLICATIONS

Mao et al., Nano Energy, 2019, 58, 192-201. (Year: 2019).*
(Continued)

*Primary Examiner* — Zhongqing Wei
(74) *Attorney, Agent, or Firm* — K&L Gates LLP

(57) ABSTRACT

A positive electrode active material is granular and comprises a compound represented by formula 1: $(Na_xA_y)_a\square_b M1[M2(CN)_6]_\delta$, wherein A is selected from at least one of alkali metal elements and has an ionic radius greater than that of sodium, M1 and M2 are each independently selected from at least one of transition metal elements, $0<y\leq0.2$, $0<x+y\leq2$, $0\leq\delta\leq1$, $a+b=2$, $0.85\leq a\leq0.98$, $\square$ represents a vacancy, and b represents the number of vacancies; and when the positive electrode active material is dissolved, at a temperature of 20° C., into an aqueous solution having a concentration of 5 g/100 g water, a pH value of the aqueous solution is in a range of 7.6 to 8.5. The positive electrode active material has good cycling and rate performance, and a high specific capacity.

19 Claims, 2 Drawing Sheets

(51) Int. Cl.
  *H01M 4/58*  (2010.01)
  *H01M 10/052*  (2010.01)
  *H01M 4/02*  (2006.01)

(52) U.S. Cl.
  CPC .. *H01M 2004/028* (2013.01); *H01M 2220/10* (2013.01)

(56) References Cited

FOREIGN PATENT DOCUMENTS

| | | |
|---|---|---|
| CN | 112723384 A | 4/2021 |
| CN | 113690433 A | 11/2021 |
| JP | 202092086 A | 6/2020 |

OTHER PUBLICATIONS

International Search Report dated Sep. 28, 2022 for Application No. PCT/CN2021/143827.

Written Opinion dated Sep. 28, 2022 for Application No. PCT/CN2021/143827.

Korean Office Action dated Aug. 2, 2023 for Application No. KR 10-2023-7018149.

Daxian Zuo, et al., "Effect of co-precipitation pH on the electrochemical properties of Prussian blue electrode materials for sodium-ion batteries", Solid State Ionics 336 (2019) 120-128.

Yang Liu, et al., "Nanostructured potassium and sodium ion incorporated Prussian blue frameworks as cathode materials for sodium-ion batteries", Chem. Commun., 2017, 53, 5569--5572.

Japanese office action dated Dec. 20, 2023 for Application No. JP 2023-532843.

Extended European Search Report dated Nov. 22, 2024 for application EP 21969760.4.

Aijun Zhou, et al., "Hexacyanoferrate-Type Prussian Blue Analogs: Principles and Advances Toward High-Performance Sodium and Potassium Ion Batteries", Advanced Energy Materials, vol. 11, No. 2, Jan. 14, 2021, 35 pages.

\* cited by examiner

POSITIVE ELECTRODE ACTIVE MATERIAL, SODIUM ION SECONDARY BATTERY COMPRISING SAME AND POWER CONSUMING DEVICE

CROSS-REFERENCE TO RELATED APPLICATION

This application is a continuation of International application PCT/CN2021/143827 filed on Dec. 31, 2021. This application is incorporated herein by reference in its entirety.

TECHNICAL FIELD

The present application relates to the technical field of secondary batteries, and in particular to a positive electrode active material, a sodium ion secondary battery comprising same and a power consuming device.

BACKGROUND

In recent years, the demand for lithium ion batteries is increasing, but limited lithium resources have limited the sustainable development of lithium ion batteries. As an important complement to the lithium ion batteries, sodium ion secondary batteries are receiving more and more attention.

Due to a series of commercial advantages such as a high capacity, high voltage plateau, rapid sodium ion transport channel, low cost and simple preparation, Prussian-blue materials are widely concerned. However, the existing Prussian-blue materials are liable to suffer from deterioration of electrochemical properties in a long-term storage. Therefore, the Prussian-blue materials still need to be improved so as to further improve the cycling performance, rate performance, etc. thereof.

SUMMARY

In order to achieve the above objective, a first aspect of the present application provides a positive electrode active material. The positive electrode active material is granular and comprises a compound represented by formula 1,

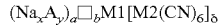   Formula 1 wherein A is selected from at least one of alkali metal elements and has an ionic radius larger than that of sodium. M1 and M2 are each independently selected from at least one of transition metal elements, $0<y\leq 0.2$, $0<x+y\leq 2$, $0<\delta\leq 1$, $a+b=2$, $0.85\leq a\leq 0.98$, □ represents a vacancy, and b represents the number of vacancies; and when the positive electrode active material is dissolved, at a temperature of 20° C., into an aqueous solution having a concentration of 5 g/100 g water, a pH value of the aqueous solution is in a range of 7.6 to 8.5.

Therefore, by means of a specific composition of the positive electrode active material and enabling the material to have a specific pH value in an aqueous solution in the present application, the water absorption of the positive electrode active material is reduced, a high-temperature cycling performance and rate performance are improved, and the specific capacity of the material is not significantly reduced, compared with a Prussian-blue material without doping the A element.

In any embodiment, when the positive electrode active material is dissolved, at a temperature of 20° C., into an aqueous solution having a concentration of 5 g/100 g water, the pH value of the aqueous solution is in a range of 7.6 to 8.3, optionally in a range of 7.8 to 8.1. The rate performance of the material can be further improved by controlling a pH value of the material in an aqueous solution having a specific concentration within the above range.

In any embodiment, a particle of the positive electrode active material has a gradient layer in which the content of A element gradually decreases from the surface of the particle to the inside of the particle. Optionally, the gradient layer has a thickness in a range of 10-100 nm. By means of such a specific distribution of A element, the high-temperature cycling performance of the material can be further improved.

In any embodiment, in the particle of the positive electrode active material, a thickness of an outermost layer is in a range of 10 nm to 50 nm, and the thickness of an outermost layer refers to a distance from the surface of the particle to a layer in which a measured content ratio of Na to A reaches Na:A=10 At %: 90 At % when the element content in the particle of the positive electrode active material is quantitatively measured by a transmission electron microscopy-energy spectrum line scan characterization. By controlling the thickness of the outermost layer, excessive reduction in the specific capacity of the material can be avoided.

In any embodiment, when the element content of the particle of the positive electrode active material is quantitatively measured by the transmission electron microscopy-energy spectrum line scan characterization, in a radial direction of the particle, a distance from a position, having a content ratio of Na to A of Na:A=50 At %: 50 At %, closest to the inside of the particle to the surface of the particle is d1, and in a radial direction of the particle, a distance from a position, having a total content of Na and A smaller than that of the transition metal elements M1 and M2, closest to the inside of the particle to the surface of the particle is d2, and d2≤d1. Therefore, the rate performance and high-temperature cycling performance of the material can be further improved.

In any embodiment, the A is independently selected from at least one of K, Rb, and Cs, optionally K. By means of the selection of the A element, a storage performance, the high-temperature cycling performance, and the specific capacity of the material can be further improved.

In any embodiment, the M1 and M2 are each independently selected from at least one of Fe, Mn, Ni, Co, Cu, and Zn. By selecting the types of the M1 and M2, the material can have a required electrochemical performance and electrochemical capacity while a structural integrity is ensured.

In any embodiment, the positive electrode active material has a volume median particle size Dv50 in a range of 1-5 μm, optionally 1.5-3 μm. The specific capacity of the material can be further improved by controlling the volume median particle size Dv50 of the material.

In any embodiment, the positive electrode active material has a specific surface area in a range of 1-10 m²/g, optionally 3-7 m²/g. By controlling the specific surface area of the material, a required doping effect may be achieved when an amount of the A element is relatively small, and a good balance between inhibiting water absorption and avoiding reducing the specific capacity of the material is realized.

A second aspect of the present application further provides a method for preparing a positive electrode active material, comprising the following steps:
1) dissolving a soluble salt of transition metal element M1 together with an optional Na-containing slow release agent in a solvent to prepare a solution a;

2) dissolving a soluble transition metal cyano complex of transition metal element M2 in a solvent to prepare a solution b;
3) under a stirring state, dropwise adding the solution a to the solution b, followed by stirring and aging after the dropwise adding is finished;
4) adding a salt of A to a suspension obtained in step 3), followed by stirring and aging, wherein the A is selected from at least one of alkali metal elements and has an ionic radius larger than that of sodium;
5) filtering a suspension obtained in step 4) and washing a filtered precipitate;
6) mixing the washed precipitate obtained in step 5) and the soluble salt of the transition metal element M1 together in water, followed by stirring and aging to form a suspension d; and
7) filtering the suspension d and washing a filtered precipitate to obtain the positive electrode active material, wherein the positive electrode active material is granular and comprises a compound represented by formula 1,

$$(Na_xA_y)_a\square_bM1[M2(CN)_6]_\delta \qquad \text{Formula 1}$$

wherein $0<y\leq0.2$, $0<x+y\leq2$, $0<\delta\leq1$, $a+b=2$, $0.85\leq a\leq0.98$ $\square$ represents a vacancy, b represents the number of vacancies, and the A, M1, and M2 are defined as above; and when the positive electrode active material is dissolved into an aqueous solution having a concentration of 5 g/100 g water, a pH value of the aqueous solution is in a range of 7.6 to 8.5.

The positive electrode active material of the present application can be prepared by the above method.

In any embodiment, in step 6), an amount of the soluble salt of the transition metal element M1 added is selected such that a pH value of the suspension d is in a range of 8.1 to 9.0, optionally in a range of 8.3 to 8.7. By controlling the pH of the suspension d, when the positive electrode active material is dissolved into an aqueous solution having a concentration of 5 g/100 g water, a pH of the aqueous solution is controlled within the range given in the present application.

In any embodiment, an amount of the precipitate added in step 6) is 5 g/100 g water to 15 g/100 g water. Therefore, it is beneficial to control a pH value of the aqueous solution within the range required in the present application when the positive electrode active material is dissolved into the aqueous solution having a concentration of 5 g/100 g water.

In any embodiment, an anion of the salt of the A is the same as that of the soluble salt of the transition metal element M1 used in step 6); and optionally, both anions are chloride ions. Therefore, the skeleton integrity of the material can be improved, and thus the high-temperature cycling performance of the material can be improved.

In any embodiment, a molar ratio of the A element to the Na element in the precipitate added in step 6) is smaller than or equal to 1:9, optionally 1:50 to 1:19. By controlling the amount of the A, the high-temperature cycling performance of the positive electrode active material can be improved and the excessive decrease in the specific capacity of the material can be avoided.

In any embodiment, before the salt of the A is added to the suspension obtained in step 3), the suspension is cooled to a temperature in a range of −20° C. to 25° C.; and optionally, the suspension is cooled to a temperature in a range of −20° C. to 10° C. By controlling the temperature of the suspension, a decreasing distribution trend of the A element from the surface of the particle of the positive electrode active material to the inside of the particle can be better controlled.

In any embodiment, an amount of the M1 in the precipitate added in step 6) is greater than or equal to 0.1 mol/L, optionally 0.4 mol/L to 1.2 mol/L, relative to a volume of the suspension d. By controlling the amount of the M1, a material with a suitable particle size can be obtained, and at the same time, material agglomeration is avoided and morphology is more independent and integral.

In any embodiment, a molar ratio of the M1 in a total amount of the soluble salt of the transition metal element M1 to the M2 in the soluble transition metal cyano complex of the transition metal element M2 is in a range of 0.8:1 to 1:0.8, optionally in a range of 0.9:1 to 1:0.9. Therefore, the specific capacity of the material can be further improved.

In any embodiment, in step 3), the solution is kept at a temperature in a range of 35° C.-120° C., optionally at a temperature in a range of 80° C.-120° C., and optionally at a temperature in a range of 90° C.-120° C. Therefore, the specific capacity of the material can be further improved.

A third aspect of the present application provides a secondary battery, comprising the positive electrode active material of the first aspect of the present application or the positive electrode active material prepared by the method of the second aspect of the present application.

A fourth aspect of the present application provides a power consuming device, comprising the secondary battery of the third aspect of the present application.

Figure 1:
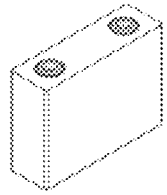
FIG. 1 is a schematic diagram of a secondary battery according to an embodiment of the present application.

LIST OF REFERENCE SIGNS 1 battery pack; 2 upper box body; 3 lower box body; 4 battery module; 5 secondary battery; 51 housing; 52 electrode assembly; 53 top cover assembly

DETAILED DESCRIPTION

Hereinafter, embodiments of the positive electrode active material and the preparation method therefor, the negative electrode plate, the secondary battery, the battery module, the battery pack, and the power consuming device of the present application are described in detail and specifically disclosed with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or closed-ended, unless otherwise stated. For example, the terms "comprising" and "including" may mean that other components not listed may also be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

The existing Prussian-blue materials are not satisfactory in storage performance and liable to suffer from deterioration of electrochemical properties in a long-term storage. For example, the long-term storage can lead to the degradation in the cycling performance of the materials.

Therefore, a first aspect of the present application provides a positive electrode active material. The positive electrode active material is granular and comprises a compound represented by formula 1,

  Formula 1 wherein A is selected from at least one of alkali metal elements and has an ionic radius larger than that of sodium. M1 and M2 are each independently selected from at least one of transition metal elements, 0<y≤0.2, 0<x+y≤2, 0<δ≤1, a+b=2, 0.85≤a≤0.98, □ represents a vacancy, and b represents the number of vacancies; and when the positive electrode active material is dissolved, at a temperature of 20° C., into an aqueous solution having a concentration of 5 g/100 g water, a pH value of the aqueous solution is in a range of 7.6 to 8.5.

When the A is a combination of two or more elements, the above definition of the numerical range of y represents a definition of the sum of the stoichiometric numbers of the elements as A.

The chemical composition of the positive electrode active material may be measured by means of inductively coupled plasma (ICP) emission spectroscopy.

The inventor has found that the performance deterioration of the Prussian-blue materials after the long-term storage is greatly correlated with the water absorption of the Prussian-blue materials during this period. In the present application, the Prussian-blue materials are modified with an alkali metal or alkaline earth metal ion having a large ionic radius, such that the ion having a large ionic radius occupies the position where crystal water possibly exists originally, the crystal water in a lattice structure is reduced, and the storage performance of the Prussian-blue materials can be improved. The inventor has further studied and found that if a pH value of the above Prussian-blue materials is controlled within a specific range at the same time, the water absorption capacity of the Prussian-blue materials can be further reduced. Even if water is absorbed, the water can be easily removed. Besides, a high-temperature cycling performance and a rate performance can be improved. At the same time, the decrease in the specific capacity of the materials due to doping the alkali metal or alkaline earth metal ion having a large ionic radius can be reduced. In addition, the higher water removal efficiency can also shorten a manufacturing period of a battery cell, simplify a manufacturing process of the battery cell, and finally reduce a cost.

The modified Prussian-blue materials of the present application can be used as a positive electrode active material in a sodium ion battery.

In some embodiments, when the positive electrode active material is dissolved, at a temperature of 20° C., into an aqueous solution having a concentration of 5 g/100 g water, the pH value of the aqueous solution is in a range of 7.6 to 8.3, optionally in a range of 7.8 to 8.1. The rate performance of the material can be further improved by controlling a pH value of the material in an aqueous solution having a specific concentration within the above range.

In some embodiments, a particle of the positive electrode active material has a gradient layer in which the content of A element gradually decreases from the surface of the particle to the inside of the particle. Optionally, the gradient layer has a thickness in a range of 10-100 nm; for example, the thickness can be 10-90 nm, 10-80 nm, 20-100 nm, 20-90 nm, 20-80 nm, 30-100 nm, 30-90 nm, 30-80 nm, and 30-75 nm. By means of such a specific distribution of A element, the high-temperature cycling performance of the material can be further improved.

In some embodiments, in the particle of the positive electrode active material, a thickness of an outermost layer is in a range of 10 nm to 50 nm, and the thickness of an outermost layer refers to a distance from the surface of the particle to a layer in which a measured content ratio of Na to A reaches Na:A=10 At %: 90 At % when the element content in the particle of the positive electrode active material is quantitatively measured by a transmission electron microscopy-energy spectrum line scan characterization. By controlling the thickness of the outermost layer, excessive reduction in the specific capacity of the material can be avoided.

In some embodiments, when the element content of the particle of the positive electrode active material is quantitatively measured by the transmission electron microscopy-energy spectrum line scan characterization, in a radial direction of the particle, a distance from a position, having a content ratio of Na to A of Na:A=50 At %: 50 At %, closest to the inside of the particle to the surface of the particle is d1, and in a radial direction of the particle, a distance from a position, having a total content of Na and A smaller than that of the transition metal elements M1 and M2, closest to the inside of the particle to the surface of the particle is d2, and d2≤d1.

In the present application, the layer meeting a specific element content measured by the transmission electron microscopy-energy spectrum line scan characterization means an abstract layer composed of all points meeting the specific element content inside the particle, that is, the layer does not mean a layer having an actual thickness. At % means a percentage of the atomic number of Na or A element relative to the sum of the atomic number of Na and A elements, measured in the transmission electron microscopy-energy spectrum line scan characterization. The transmission electron microscopy-energy spectrum line scan characterization can be performed by using a transmission electron microscope (STEM, ThermoFisher, Talos F200i) in combination with a side inserted scalable energy dispersive X-ray spectroscopy (EDS, ThermoFisher) to conduct a line scan analysis on the material in a display field.

The area defined between the layer, having the total content of Na and A less than the total content of the transition metal elements M1 and M2, closest to the inside of the particle and the surface of the particle is called a vacancy layer. Optionally, the vacancy layer has a thickness d2 in a range of 9-35 nm. By controlling the thickness of the vacancy layer as described above, the rate performance and high-temperature cycling performance of the material can be further improved.

In some embodiments, the A is independently selected from at least one of K, Rb, and Cs, optionally K. By means of the selection of the A element, a storage performance, the high-temperature cycling performance, and the specific capacity of the material can be further improved.

In some embodiments, the M1 and M2 are each independently selected from at least one of Fe, Mn, Ni, Co, Cu, and Zn. By selecting the types of the M1 and M2, the material can have a required electrochemical performance and electrochemical capacity while a structural integrity is ensured.

In some embodiments, the positive electrode active material has a volume median particle size Dv50 in a range of 1-5 μm, optionally 1.5-3 μm. The specific capacity of the material can be further improved by controlling the volume median particle size Dv50 of the material. The volume median particle size Dv50 can be measured by a conventional method known to those skilled in the art, for example, can be measured with reference to the standard GB/T 19077.1-2016 using a laser particle size analyzer (e.g. Malvern Master Size 3000). Dv50 is physically defined as follows: the corresponding particle size when the cumulative volume distribution percentage of the material particle reaches 50%.

In some embodiments, the positive electrode active material has a specific surface area in a range of 1-10 m²/g, optionally 3-7 m²/g. By controlling the specific surface area of the material, a required doping effect may be achieved when an amount of the A element is relatively small, the doping is even, and as few A element as possible is used to achieve as wide a doping effect as possible. Besides, the even doping is beneficial to realizing a good balance between inhibiting water absorption and avoiding reducing the specific capacity of the material. The specific surface area can be measured by a conventional method known to those skilled in the art. For example, according to the national standard GB/T 19587-2004, after the adsorption amount of gas on a solid surface under different relative pressures is measured at a constant low temperature, the adsorption amount of a test sample monomolecular layer is obtained based on a Brunauer-Emmett-Teller (BET) multi-layer adsorption theory and the formula thereof, and thus the specific surface area of the solid can be calculated.

A second aspect of the present application provides a method for preparing a positive electrode active material, comprising the following steps:
1) dissolving a soluble salt of transition metal element M1 together with an optional Na-containing slow release agent in a solvent to prepare a solution a;
2) dissolving a soluble transition metal cyano complex of transition metal element M2 in a solvent to prepare a solution b;
3) under a stirring state, dropwise adding the solution a to the solution b, followed by stirring and aging after the dropwise adding is finished;
4) adding a salt of A to a suspension obtained in step 3), followed by stirring and aging, wherein the A is selected from at least one of alkali metal elements and has an ionic radius larger than that of sodium;
5) filtering a suspension obtained in step 4) and washing a filtered precipitate;
6) mixing the washed precipitate obtained in step 5) and the soluble salt of the transition metal element M1 together in water, followed by stirring and aging to form a suspension d; and
7) filtering the suspension d and washing a filtered precipitate to obtain the positive electrode active material, wherein the positive electrode active material is granular and comprises a compound represented by formula 1,

(Na$_x$A$_y$)$_a$□$_b$M1[M2(CN)$_6$]$_\delta$      Formula 1 wherein 0<y≤0.2, 0<x+y≤2, 0<δ≤1, a+b=2, 0.85≤a≤0.98, □ represents a vacancy, b represents the number of vacancies, and the A, M1, and M2 are defined as above; and when the positive electrode active material is dissolved into an aqueous solution having a concentration of 5 g/100 g water, a pH value of the aqueous solution is in a range of 7.6 to 8.5.

The description and definition for M1, M2, A, x, y, δ, a, and b in the description of the positive electrode active material are also applicable to the preparation method for the positive electrode active material.

The positive electrode active material of the present application can be prepared by the above method.

In some embodiments, in step 6), an amount of the soluble salt of the transition metal element M1 added is selected such that a pH value of the suspension d is in a range of 8.1 to 9.0, for example, the pH value can be in a range of 8.3 to 8.7 and in a range of 8.4 to 8.6. By controlling the pH of the suspension d, when the positive electrode active material is dissolved into an aqueous solution having a concentration of 5 g/100 g water, a pH value of the aqueous solution is within the range given in the present application.

In some embodiments, an amount of the precipitate added in step 6) is 5 g/100 g water to 15 g/100 g water. Therefore, it is beneficial to control a pH value of the aqueous solution within the range required in the present application when the positive electrode active material is dissolved into the aqueous solution having a concentration of 5 g/100 g water.

In some embodiments, an anion of the salt of the A is the same as that of the soluble salt of the transition metal element M1 used in step 6); and optionally, both anions are chloride ions. Therefore, the skeleton integrity of the material can be improved, and thus the high-temperature cycling performance of the material can be improved.

In some embodiments, a molar ratio of the A element to the Na element in the precipitate added in step 6) is smaller than or equal to 1:9, optionally 1:50 to 1:19. By controlling the amount of the A, a positive electrode active material with the required composition can be obtained, the high-temperature cycling performance of the positive electrode active material can be improved, and the excessive decrease in the specific capacity of the material can be avoided.

In some embodiments, before the salt of the A is added to the suspension obtained in step 3), the suspension is cooled to a temperature in a range of −20° C. to 25° C.; and optionally, the suspension is cooled to a temperature in a range of −20° C. to 10° C. By controlling the temperature of the suspension, a decreasing distribution trend of the A element from the surface of the particle of the positive electrode active material to the inside of the particle can be better controlled.

In some embodiments, an amount of the M1 in the precipitate added in step 6) is greater than or equal to 0.1 mol/L, optionally 0.4 mol/L to 1.2 mol/L, relative to a volume of the suspension d. By controlling the amount of the M1, a material with a suitable particle size can be obtained, and at the same time, material agglomeration is avoided and morphology is more independent and integral.

In some embodiments, a molar ratio of the M1 in a total amount of the soluble salt of the transition metal element M1 to the M2 in the soluble transition metal cyano complex of the transition metal element M2 is in a range of 0.8:1 to 1:0.8, optionally in a range of 0.9:1 to 1:0.9. Therefore, the specific capacity of the material can be further improved.

In some embodiments, in step 3), the solution is kept at a temperature in a range of 35° C.-120° C., optionally at a temperature in a range of 80° C.-120° C. and optionally at a temperature in a range of 90° C.-120° C. Therefore, the specific capacity of the material can be further improved.

There is no special restriction on the anion of the soluble salt of the transition metal element M1 in step 1). In some embodiments, the soluble salt of the transition metal element M1 in step 1) is a divalent sulfate, a nitrate, a chloride or a salt of a weak acid, such as an oxalate. The concentration of the soluble salt in the solution is, for example, in a range of 0.01 mol/L-1 mol/L.

In some embodiments, the Na-containing slow release agent in step 1) is selected from at least one of sodium citrate, sodium ascorbate, disodium ethylenediaminetetraacetate, tetrasodium ethylenediaminetetraacetate, sodium chloride, sodium sulfate, and sodium acetate.

The solvent in step 1) may dissolve the soluble salt of the transition metal element M1 and the optional Na-containing slow release agent. In some embodiments, the solvent in step 1) may be, for example, selected from water, acetonitrile, adiponitrile, methanol, ethanol, formamide, dimethyl sulfoxide, etc.

In some embodiments, the soluble transition metal cyano complex in step 2) is a divalent transition metal sodium cyanide. The concentration of the complex in the solution is, for example, in a range of 0.01 mol/L-1 mol/L.

In some embodiments, the solvent in step 2) is the same as that in step 1).

In some embodiments, in step 3), the solution a is dropwise added at a rate of 0.1 ml/min-10 ml/min, for example, at a rate of 1 ml/min.

In some embodiments, in step 3), the stirring rate is in a range of 200 rpm to 1,200 rpm.

In some embodiments, in step 3), the aging is performed for 0.01 h-48 h, for example, 12 h.

In some embodiments, in step 4), the stirring and aging are performed for 5-60 min. In some embodiments, in step 6), the stirring and aging are performed at a stirring rate of 100-2,000 rpm for 1-24 h, for example, 10 min to 2 h.

The particle size and morphology of the material can be better controlled by controlling the time and stirring rate of the stirring and aging.

The washing in step 5) may be performed by those skilled in the art by selecting an appropriate solvent. In some embodiments, in step 5), the washing may be performed with deionized water, ethanol or acetone, etc. and may be performed once or more.

The washing in step 7) may be performed by those skilled in the art by selecting an appropriate solvent. In some embodiments, in step 7), the washing may be performed with deionized water, ethanol or acetone, etc. and may be performed once or more.

In addition, the secondary battery, battery module, battery pack, and power consuming device of the present application are described below with reference to the accompanying drawings as appropriate.

In one embodiment of the present application, a sodium ion secondary battery is provided.

Typically, a secondary battery comprises a positive electrode plate, a negative electrode plate, an electrolyte and a separator. During a charge/discharge process of the battery, active ions are intercalated and de-intercalated back and forth between a positive electrode plate and a negative electrode plate. The electrolyte functions to conduct ions between the positive electrode plate and the negative electrode plate. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, and the positive electrode film layer comprises the positive electrode active material of the first aspect of the present application, or the positive electrode active material prepared by the method of the second aspect of the present application.

As an example, the positive electrode current collector has two surfaces opposite in its own thickness direction, and the positive electrode film layer is provided on either or both of opposite surfaces of the positive electrode current collector.

In some embodiments, the positive electrode current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methylpyrrolidone) to form a positive electrode slurry; and coating the positive electrode current collector with the positive electrode slurry, followed by the procedures such as drying and cold pressing, so as to obtain the positive electrode plate.

[Negative Electrode Plate]

The negative electrode plate comprises a negative electrode current collector and a negative electrode film layer provided on at least one surface of the negative electrode current collector, the negative electrode film layer comprising a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector can be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PSZ), polyethylene (PE), etc.).

In some embodiments, the negative electrode active material can be a negative electrode active material known in the art for batteries. As an example, the negative electrode active material may include at least one of the following materials: hard carbon, artificial graphite, natural graphite, soft carbon, a silicon-based material, a tin-based material, lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g. sodium carboxymethyl cellulose (CMC-Na)) and the like.

In some embodiments, the negative electrode plate can be prepared as follows: dispersing the above-mentioned components for preparing the negative electrode plate, such as negative electrode active material, conductive agent, binder and any other components, in a solvent (e.g. deionized water) to form a negative electrode slurry; and coating a negative electrode current collector with the negative electrode slurry, followed by procedures such as drying and cold pressing, so as to obtain the negative electrode plate.

[Electrolyte]

The electrolyte functions to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, the electrolyte is in a liquid state, that is, an electrolyte solution. The electrolyte solution includes an electrolyte salt and a solvent.

In some embodiments, the electrolyte salt may be selected from $NaClO_4$, $NaPF_6$, $NaBF_4$, NaTFSI (sodium bis(trifluoromethanesulfonylimide)), NaFSI (sodium bis(fluorosulfonylimide)), NaDFOB (sodium difluoro(oxalato)borate), etc.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be a single-layer film or a multi-layer composite film, and is not limited particularly. When the separator is a multi-layer composite film, the materials in the respective layers may be same or different, which is not limited particularly.

In some embodiments, the positive electrode plate, the negative electrode plate and the separator can be made into the electrode assembly by a winding process or a stacking process.

In some embodiments, the secondary battery may comprise an outer package. The outer package can be used to encapsulate the above-mentioned electrode assembly and electrolyte.

In some implementations, the outer package of the secondary battery may be a hard shell, such as a hard plastic shell, an aluminum shell, or a steel shell. The outer package of the secondary battery may also be a soft bag, such as a pouch-type soft bag. The material of the soft bag may be plastics, and the examples of plastics may include polypropylene, polybutylene terephthalate, polybutylene succinate, etc.

The shape of the secondary battery is not particularly limited in the present application, and may be cylindrical, square or of any other shape. For example, FIG. 1 shows a secondary battery 5 with a square structure as an example.

Figure 2:
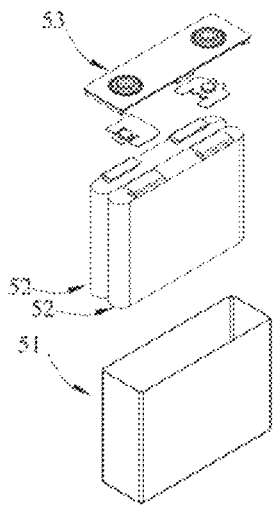
FIG. 2 is an exploded view of a secondary battery according to an embodiment of the present application as shown in FIG. 1.

In some embodiments, referring to FIG. 2, an outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a stacking process to form an electrode assembly 52. The electrode assembly 52 is encapsulated in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 3:
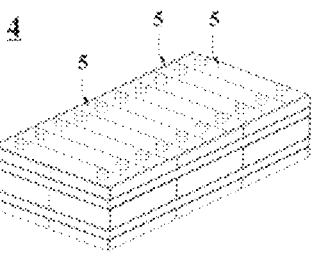
FIG. 3 is a schematic diagram of a battery module according to an embodiment of the present application.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above battery module may also be assembled into a battery pack, the number of the battery modules contained in the battery pack may be one or more, and the specific number can be selected by those skilled in the art according to the application and capacity of the battery pack.

Figure 4:
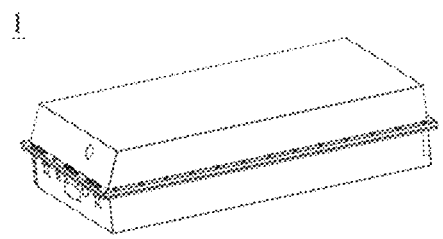
FIG. 4 is a schematic diagram of a battery pack according to an embodiment of the present application.
Figure 5:
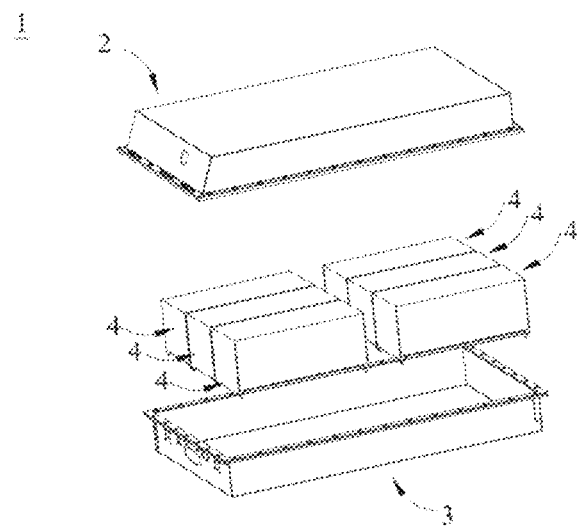
FIG. 5 is an exploded view of a battery pack according to an embodiment of the present application as shown in FIG. 4.

FIG. 4 and FIG. 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 6:
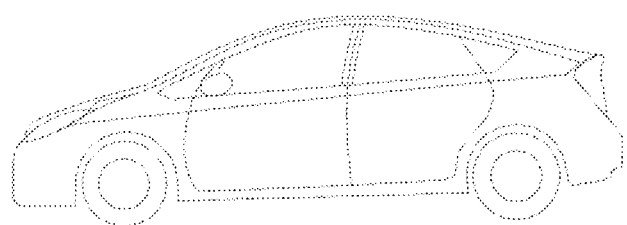
FIG. 6 is a schematic diagram of a power consuming device using a secondary battery according to an embodiment of the present application as a power source.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the device may be a mobile phone, a tablet computer, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Example 1

Preparation of Positive Electrode Active Material:
(1) 7.9164 g of manganese chloride tetrahydrate and 35.292 g of sodium citrate monohydrate are added to 100 ml of deionized water, and stirred for 30 min to form a solution a;
(2) 19.3624 g of sodium ferrocyanide decahydrate is added to 100 ml of deionized water and stirred for 30 min to form a solution b;
(3) under a stirring state, the solution a is dropwise added to the solution b at a dropwise adding rate of 1 ml/min, followed by stirring for 24 h, after the dropwise adding is finished, at a stirring rate of 400 rpm at a temperature of 80° C. to form a suspension;

(4) the suspension obtained in step (3) is cooled to 5° C., 0.7 g of potassium chloride is added, and stirred for 60 min to form a suspension c;

(5) the suspension c obtained in step (4) is filtered, and the obtained solid is washed twice with deionized water and vacuum-dried at 150° C. for 6 h to obtain 12.6 g of a solid product $Na_{1.9}K_{0.1}Mn[Fe(CN)_6]$;

(6) 6.8 g of a manganese chloride tetrahydrate solid, 100 ml of deionized water, and the solid product obtained in step (5) are mixed, and stirred for 30 min to form a suspension d, with a stirring rate of 500 rpm, the suspension d finally has a pH value of 8.3; and (7) the suspension d is filtered and the obtained solid is washed 3 times with deionized water to obtain a positive electrode active material. The chemical formula of the positive electrode active material determined by an ICP test is $(Na_{1.9}K_{0.1})_{0.88}\square_{0.12}Mn[Fe(CN)_6]_{0.94}$. When the positive electrode active material is dissolved, at a temperature of 20° C., into an aqueous solution having a concentration of 5 g/100 g water, a pH of the aqueous solution is 7.6. Besides, the positive electrode active material meets: the thickness of the gradient layer is 75 μm and the content of element K decreases gradually in the thickness range of the gradient layer; the thickness of the outermost layer is 15 μm; the thickness of the vacancy layer is 34 μm; Dv50 is 2 μm; and the specific surface area is 4 m²/g.

Example 2

A positive electrode active material is prepared by the steps similar to those in example 1, except that the amount of the manganese chloride tetrahydrate in step (6) is changed, as shown in Table 1.

Example 3

A positive electrode active material is prepared by the steps similar to those in example 1, except that the amount of the manganese chloride tetrahydrate in step (6) is changed, as shown in Table 1.

Example 4

A positive electrode active material is prepared by the steps similar to those in example 1, except that the amount of the manganese chloride tetrahydrate in step (6) is changed, as shown in Table 1.

Example 5

A positive electrode active material is prepared by the steps similar to those in example 1, except that the amount of the manganese chloride tetrahydrate in step (6) is changed, as shown in Table 1.

Example 6

A positive electrode active material is prepared by the steps similar to those in example 1, except that the amount of the potassium chloride in step (4) is changed, as shown in Table 1. The solid product obtained in step (5) has a chemical formula of $Na_{1.96}K_{0.04}Mn[Fe(CN)_6]$.

Example 7

A positive electrode active material is prepared by the steps similar to those in example 1, except that the amount of the potassium chloride in step (4) is changed, as shown in Table 1. The solid product obtained in step (5) has a chemical formula of $Na_{1.8}K_{0.2}Mn[Fe(CN)_6]$.

Comparative Example 1

According to example 1, the solid product obtained after the suspension c is filtered and washed is used as a final positive electrode active material.

Comparative Example 2

A positive electrode active material is prepared by the steps similar to those in example 1, except that the amount of the manganese chloride tetrahydrate in step (6) is changed, as shown in Table 1.

Comparative Example 3

A positive electrode active material is prepared by the steps similar to those in example 1, except that the amount of the potassium chloride in step (4) and the amount of the manganese chloride tetrahydrate in step (6) are changed, as shown in Table 1.

Preparation of Battery (1) Preparation of Positive Electrode Plate

The positive electrode active material prepared in the examples and comparative examples, a conductive agent carbon black (Super-P), and a binder polyvinylidene fluoride (PVDF) in a mass ratio of 7:2:1 are added to N-methyl pyrrolidone (NMP), and stirred for 1-3 h with a rotor to form a slurry. The slurry is coated onto a current collector aluminum foil with a coating thickness of 150 μm. The coated current collector aluminum foil is dried in a vacuum drying oven at 90-110° C. for 10-15 h and then naturally cooled down to room temperature to obtain a positive electrode plate. The prepared positive electrode plate is sliced into a small round piece with a diameter of 14 mm by a slicing machine.

(2) Preparation of Negative Electrode Plate

A type II commercial hard carbon negative electrode active material purchased from Kuraray, Japan, a conductive agent carbon black (Super-P), a binder styrene butadiene rubber (SBR), and a dispersant sodium carboxymethyl cellulose (CMC-Na) in a mass ratio of 90:2:4:4 are added to deionized water, and stirred for 1-3 h with a rotor to form a slurry. The slurry is coated onto a current collector copper foil. The coating amount is determined according to an absolute capacity of a positive electrode: an absolute capacity of a negative electrode: an absolute capacity of the positive electrode=1.16, wherein an absolute capacity (mAh)=first discharging reversible specific capacity (mAh/g)*total weight of active material (g). The measurement method for the reversible specific capacity is described below. The coated current collector copper foil is dried in a vacuum drying oven at 90-110° C. for 10-15 h and then naturally cooled down to room temperature to obtain a negative electrode plate. The prepared negative electrode plate is sliced into a small round piece with a diameter of 16 mm by a slicing machine.

(3) Preparation of Electrolyte Solution

In an argon atmosphere glove box with a water content of <10 ppm, equal volumes of ethylene carbonate (EC) and diethyl carbonate (DEC) are uniformly mixed to obtain an organic solvent, an additive fluoroethylene carbonate (FEC) is added to the organic solvent, and then sodium salt $NaPF_6$ is uniformly dissolved in the organic solvent to obtain an electrolyte solution, wherein a mass percentage of the FEC in the electrolyte solution is 2% and the concentration of the sodium salt is 1 mol/L.

(4) Separator

PE is used as a separator.

(5) Preparation of Button Full Battery

The above parts are assembled into a CR 2032 button full battery as the following secondary battery in the glove box filled with an argon atmosphere.

Performance Test Method

1. Test of Positive Electrode Active Material (1) ICP Test

A substance to be tested is heated to 500° C. and calcined for 2 h, and then cooled to room temperature. Aqua regia is added to dissolve the calcined product and an elemental analysis is performed by inductively coupled plasma emission spectroscopy (ICP, Ametek, model: SPECTRO ARCOS ICP-OES). The test can obtain the proportion of each element. X, y, δ, a, and b in the chemical formula $(Na_xA_y)_a\square_bM1[M2(CN)_6]\delta$ are determined by the proportion of each element. Specifically, the subscript of the M1 element in the formula is 1, and x, y, and δ are obtained by conversion from the content ratios of the M2, Na, and A elements to the M1 element; and a and b are derived from a charge balance, specifically, $a*(x+y)+b*0+1*2+\delta*(2-6)=0$. After a is obtained, b is obtained by $a+b=1$.

(2) Transmission Electron Microscopy-Energy Spectrum Line Scan (EDS Line Scan) Test A transmission electron microscope (STEM, ThermoFisher, Talos F200i) is combined with a side inserted scalable energy dispersive X-ray spectroscopy (EDS, ThermoFisher) to conduct a line scan analysis on the material in a display field, wherein an accelerating voltage is 50 kV, an amplification factor is 100 kx, and a beam current is between 500 and 1,000 pA. A line scan spectrum of counts of Na and A elements is obtained. The thickness of the gradient layer may be obtained by determining the layer of Na:A=50 At %: 50 At % according to the count ratio of the Na and A elements and the surface of the positive electrode active material. The thickness of the outermost layer may be obtained by determining the layer of Na:A=10 At %: 90 At % according to the count ratio of the Na and A elements and the surface of the positive electrode active material.

In the same way, a line scan spectrum of counts of Na, A, Mn, and Fe elements is obtained. The boundary of the vacancy layer is determined according to the count ratio of the Na, A, Mn, and Fe elements, and thus the thickness of the vacancy layer is obtained.

In the above measurement of each thickness, 5 positions are randomly selected on the positive electrode active material particle and measured, respectively. The average value of the measured values is recorded as a measurement result.

(3) pH Test 5 g of the material to be tested is placed into 100 g of water and stirred for 5 min until a homogeneous solution is formed. A pH test is performed at a temperature of 20° C.

(4) 30 Min Water Removal Efficiency Test 30 min water removal efficiency=30 min water removal amount/total water content of material. The 30 min water removal amount and the total water content of material are measured by a Karl Fischer method (Switzerland Wantong 831 moisture tester). A test temperature is 170° C. and nitrogen purging is performed at a rate of 50 mL/min during the test. The extraction time is set to be 30 min and the obtained absolute water content is recorded as the 30 min water removal amount. The extraction time is set to be infinite until a water signal detected by the tester reaches an environmental background value, then the total water content of material is recorded.

(5) Dv50 Test

The measurement is performed with reference to the standard GB/T 19077.1 2016 using a laser particle size analyzer (e.g. Malvern Master Size 3000).

Dv50 is physically defined as follows: the corresponding particle size when the cumulative volume distribution percentage of the material particle reaches 50%.

(6) Specific Surface Area Test

A specific surface area is measured with reference to GB/T 19587-2017 using a nitrogen adsorption specific surface area analysis test method, and calculated with a BET (Brunauer Emmett Teller) method, wherein the nitrogen adsorption specific surface area analysis test is performed by a Tri-Star 3020 type specific surface area pore size analysis tester from Micromeritics Company in the United States.

2. Performance Test of Battery

[Reversible Specific Capacity]

Preparation of button half battery: A positive electrode plate, an electrolyte solution, and a separator are all the same as those of the button full battery. A metallic sodium piece (a small round piece with a diameter of 13 mm) is used as a negative electrode and a nickel mesh is used as a negative electrode current collector. The above parts are assembled into a CR 2032 button half battery in an argon gas-protected glove box.

The button half battery is charged and discharged at a current density of 20 mA/g and 25° C. in a range of 2.5-4.0 V, the capacity of the battery in the first charging and discharging process is recorded, and a reversible specific capacity is obtained by dividing the capacity by a mass of the positive electrode active material. The results of the first discharging reversible specific capacity test of the battery prepared from the positive electrode active materials of the respective examples and comparative examples are listed in Table 1 below.

[Rate Performance]

At 25° C., the secondary batteries of the respective examples and comparative examples are charged to 4 V at a constant current rate of 0.1 C, then charged to a current of 0.05 C at a constant voltage, left to stand for 5 min, and then discharged to 2 V at a constant current rate of 0.1 C; the discharging capacity at this time is recorded, which is the discharging capacity at 0.1 C; the secondary batteries are left to stand for 30 min, then charged to 4V at a constant current rate of 1 C, then charged to a current of 0.05 C at a constant voltage, left to stand for 5 min, and then discharged to 2 V at a constant current rate of 1 C; the discharging capacity at this time is recorded, which is the discharging capacity at 1 C;

Battery rate performance 1 C/0.1 C (%)=1 C discharging capacity/0.1 C discharging capacity×100%.

[High-Temperature Cycling Performance]

At 45° C., the secondary batteries prepared in the examples and the comparative examples are charged at a constant current rate of 1 C until a charging cut-off voltage of 4 V, then charged to a current of <0.05 C at a constant voltage, left to stand for 5 min, and then discharged at a constant current rate of 1 C until a discharging cut-off voltage of 2 V. The discharging capacity of the first circle of the batteries is measured and the batteries are left to stand for 5 min. This is a charging and discharging cycle. The batteries are subjected to a cyclic charging and discharging test according to the method for a total of 200 cycles. The discharging capacity of the last cycle is obtained. High-temperature cycle capacity retention rate (%)=discharging capacity of the last cycle/discharging capacity of the first cycle.

TABLE 1

| | Preparation process of material | | | | Positive electrode active material | | | | |
|---|---|---|---|---|---|---|---|---|---|
| | Amount of potassium chloride in g/100 ml | Amount manganese chloride tetrahydrate in g/100 ml | pH of suspension d | Amount of solid product added in step (6)(g) | Chemical formula of positive electrode active material | pH of 5 g/100 g aqueous solution of positive electrode active material | Thickness of gradient layer (nm) | Thickness of vacancy layer (nm) | Thickness of outermost layer (nm) |
| Example 1 | 0.7 | 6.8 | 8.3 | 5 | $(Na_{1.9}K_{0.1})_{0.88\square 0.12}Mn[Fe(CN)_6]_{0.94}$ | 7.6 | 75 | 34 | 15 |
| Example 2 | 0.7 | 6.3 | 8.5 | 5 | $(Na_{1.9}K_{0.1})_{0.90\square 0.10}Mn[Fe(CN)_6]_{0.95}$ | 7.8 | 75 | 25 | 15 |
| Example 3 | 0.7 | 5.6 | 8.6 | 5 | $(Na_{1.9}K_{0.1})_{0.92\square 0.08}Mn[Fe(CN)_6]_{0.96}$ | 8.1 | 75 | 15 | 15 |
| Example 4 | 0.7 | 4.5 | 8.7 | 5 | $(Na_{1.9}K_{0.1})_{0.93\square 0.07}Mn[Fe(CN)_6]_{0.965}$ | 8.3 | 75 | 11 | 15 |
| Example 5 | 0.7 | 2.9 | 9.0 | 5 | $(Na_{1.9}K_{0.1})_{0.95\square 0.05}Mn[Fe(CN)_6]_{0.975}$ | 8.5 | 75 | 9 | 15 |
| Example 6 | 0.28 | 6.8 | 8.3 | 5 | $(Na_{1.96}K_{0.04})_{0.95\square 0.05}Mn[Fe(CN)_6]_{0.94}$ | 7.6 | 32 | 44 | 8 |
| Example 7 | 1.4 | 6.8 | 8.3 | 5 | $(Na_{1.8}K_{0.2})_{0.88\square 0.12}Mn[Fe(CN)_6]_{0.94}$ | 7.6 | 100 | 26 | 23 |
| Comparative Example 1 | 0.7 | — | 9.3 | — | $Na_{1.9}K_{0.1}Mn[Fe(CN)_6]$ | 8.9 | 75 | — | 15 |
| Comparative Example 2 | 0.7 | 8.2 | 7.5 | 5 | $(Na_{1.9}K_{0.04})_{0.95\square 0.05}Mn[Fe(CN)_6]_{0.94}$ | 6.5 | 75 | 90 | 15 |
| Comparative Example 3 | 1.5 | 7.1 | 7.9 | 5 | $(Na_{1.75}K_{0.25})_{0.92\square 0.08}Mn[Fe(CN)_6]_{0.96}$ | 7 | 150 | 32 | 7 |

| | Performance test | | | |
|---|---|---|---|---|
| | 30 min water removal efficiency (%) | First discharging reversible specific capacity (mAh/g) | Rate performance 1 C/0.1 C (%) | High-temperature cycle capacity retention rate (%) |
| Example 1 | 94 | 154.3 | 93.6 | 81.9 |
| Example 2 | 90 | 154.6 | 92.2 | 83.8 |
| Example 3 | 85 | 154.8 | 90.8 | 84.6 |
| Example 4 | 80 | 154.9 | 86.9 | 84.8 |
| Example 5 | 76 | 155.6 | 85.1 | 87.1 |
| Example 6 | 95 | 155.0 | 93.8 | 80.5 |
| Example 7 | 91 | 153.1 | 89.9 | 84.2 |
| Comparative Example 1 | 15 | 152.1 | 82.0 | 79.2 |
| Comparative Example 2 | 90 | 125 | 92.7 | 76.4 |
| Comparative Example 3 | 12 | 132 | 79.3 | 85.7 |

As can be seen from the data in Table 1, the positive electrode active materials of examples 1-7 have specific compositions. Besides, when the pH of the positive electrode active materials with the specific compositions in the aqueous solution having a concentration of 5 g/100 g water is controlled within the range specified in the present application, the water removal efficiency, the specific capacity, the high-temperature cycling performance, and the rate performance of the positive electrode active material are all significantly improved.

It should be noted that the present application is not limited to the above embodiments. The above embodiments are exemplary only, and any embodiment that has substantially same constitutions as the technical ideas and has the same effects within the scope of the technical solutions of the present application falls within the technical scope of the present application. Furthermore, various modifications to the embodiments that can be conceived by those skilled in the art, and other implementations constructed by combining some of the constituent elements of the embodiments also fall within the scope of the present application without departing from the spirit of the present application.

What is claimed is:

1. A positive electrode active material comprising a compound represented by Formula 1, $$(Na_xA_y)_{a\square b}M1[M2(CN)_6]_\delta \qquad \text{Formula 1}$$

wherein A is selected from at least one of alkali metal elements and has an ionic radius greater than that of sodium, M1 and M2 are each independently selected from at least one of transition metal elements, $0<y\leq 0.2$, $0<x+y\leq 2$, $0<\delta\leq 1$, $a+b=2$, $0.85\leq a\leq 0.98$, $\square$ represents a vacancy, and b represents the number of vacancies; and when the positive electrode active material is dissolved in water, an aqueous solution having a concentration of 5 g/100 g water is obtained, a pH value of the aqueous solution at a temperature of 20° C. is 7.6 to 8.5, wherein a particle of the positive electrode active material comprises:

a gradient layer, in which a content of the A element gradually decreases in a direction from an external surface of the particle toward an interior portion of the particle, the gradient layer having a thickness in a range of 10 nm to 100 nm;

an outermost layer, defined as a region from the external surface of the particle to a position within the particle where the content ratio of Na to A reaches 10 atom %:90 atom %, as measured by transmission electron microscopy-energy spectrum (TEM-EDS) line scan characterization, the outermost layer having a thickness in a range of 10 nm to 50 nm; and a vacancy layer, defined as a region from the external surface of the particle to a position within the particle where a total content by atom % of Na and A becomes less than a total content by atom % of M1 and M2, as measured by TEM-EDS line scan characterization, the vacancy layer having a thickness d2 in a range of 9 nm to 35 nm.

2. The positive electrode active material according to claim 1, wherein, the pH value of the aqueous solution at a temperature of 20° C. is 7.6 to 8.3.

3. The positive electrode active material according to claim 1, wherein the thickness of the gradient layer is in a range of 32-100 nm.

4. The positive electrode active material according to claim 1, wherein, in a radial direction of the particle, a distance from a position inside the particle where a content ratio of Na to A of Na:A=50 atom %:50 atom % to the surface of the particle is d1, and in a radial direction of the particle, a thickness of the vacancy layer of the particle is d2, and d2≤d1, the content by atom % of Na and A in the particle of the positive electrode active material is quantitatively measured by transmission electron microscopy energy spectrum line scan characterization.

5. The positive electrode active material according to claim 1, wherein, the A is independently selected from at least one of K, Rb, and Cs, optionally K.

6. The positive electrode active material according to claim 1, wherein, the M1 and M2 are each independently selected from at least one of Fe, Mn, Ni, Co, Cu, and Zn.

7. The positive electrode active material according to claim 1, wherein, the positive electrode active material has a volume median particle size $D_v50$ in a range of 1-5 μm.

8. The positive electrode active material according to claim 1, wherein, the positive electrode active material has a specific surface area in a range of 1-10 $m^2/g$.

9. A method for preparing a positive electrode active material, comprising the following steps:

1) Dissolving a soluble salt of transition metal element M1 together with an optional Na-containing slow release agent in a solvent to prepare a solution a;

2) Dissolving a soluble transition metal cyano complex of transition metal element M2 in a solvent to prepare a solution b;

3) Under a stirring state, dropwise adding the solution a to the solution b, followed by stirring and aging after the dropwise adding is finished;

4) adding a salt of A to a suspension obtained in step 3), followed by stirring and aging, wherein the A is selected from at least one of alkali metal elements and has an ionic radius larger than that of sodium;

5) Filtering a suspension obtained in step 4) and washing a filtered precipitate;

6) Mixing the washed precipitate obtained in step 5) and the soluble salt of the transition metal element M1 together in water, followed by stirring and aging to form a suspension d, wherein the amount of the soluble salt of the transition metal element M1 added is selected to obtain a pH value of the suspension d in a range of 8.1 to 9.0; and 7) Filtering the suspension d and washing a filtered precipitate to obtain the positive electrode active material, wherein the positive electrode active material is granular and comprises a compound represented by formula 1, $$(Na_xA_y)_a\square_bM1[M2(CN)_6]_\delta \quad \text{Formula 1}$$

wherein 0<y≤0.2, 0<x+y≤2, 0<δ≤1, a+b=2, 0.85≤a≤0.98, $\square$ represents a vacancy, b represents the number of vacancies, and the A, M1, and M2 are defined as above; and when the positive electrode active material is dissolved in water, an aqueous solution having a concentration of 5 g/100 g water is obtained, a pH value of the aqueous solution at a temperature of 20° C. is 7.6 to 8.5, wherein a particle of the positive electrode active material comprises:

a gradient layer, in which a content of the A element gradually decreases in a direction from an external surface of the particle toward an interior portion of the particle, the gradient layer having a thickness in a range of 10 nm to 100 nm;

an outermost layer, defined as a region from the external surface of the particle to a position within the particle where the content ratio of Na to A reaches 10 atom %:90 atom %, as measured by transmission electron microscopy-energy spectrum (TEM-EDS) line scan characterization, the outermost layer having a thickness in a range of 10 nm to 50 nm; and a vacancy layer, defined as a region from the external surface of the particle to a position within the particle where a total content by atom % of Na and A becomes less than a total content by atom % of M1 and M2, as measured by TEM-EDS line scan characterization, the vacancy layer having a thickness d2 in a range of 9 nm to 35 nm.

10. The method according to claim 9, wherein, in step 6), an amount of the soluble salt of the transition metal element M1 added is selected to obtain a pH value of the suspension d in a range of 8.1 to 9.0.

11. The method according to claim 9, wherein, an amount of the precipitate added in step 6) is 5 g/100 g water to 15 g/100 g water.

12. The method according to claim 9, wherein, an anion of the salt of the A is the same as that of the soluble salt of the transition metal element M1 used in step 6).

13. The method according to claim 9, wherein, a molar ratio of the A element to the Na element in the precipitate added in step 6) is smaller than or equal to 1:9.

14. The method according to claim 9, wherein, before the salt of the A is added to the suspension obtained in step 3), the suspension is cooled to a temperature in a range of −20° C. to 25° C.

15. The method according to claim 9, wherein, an amount of the M1 in the precipitate added in step 6) is greater than or equal to 0.1 mol/L, relative to a volume of the suspension d.

16. The method according to claim 1, wherein, a molar ratio of the M1 in a total amount of the soluble salt of the transition metal element M1 to the M2 in the soluble transition metal cyano complex of the transition metal element M2 is in a range of 0.8:1 to 1:0.8.

17. The method according to claim 9, wherein,
in step 3), the solution is kept at a temperature in a range of 35° C.-120° C.

18. A secondary battery comprising a positive electrode active material according to claim 1.

19. A power consuming device comprising a secondary battery according to claim 18.

* * * * *